(12) United States Patent
Hancock et al.

(10) Patent No.: US 11,087,254 B2
(45) Date of Patent: Aug. 10, 2021

(54) AUTOMATIC UPDATING INTERACTIVE QUERY ANSWERING AND FEATURE TRAINING METHOD AND SYSTEM

(71) Applicant: 4D Technologies, LLC, Bedford, NH (US)

(72) Inventors: James Hancock, West Chesterfield, NH (US); Jared Germano, Nashua, NH (US); David Micciche, Manchester, NH (US); Matthew Murphy, New Durham, NH (US); Daniel Dolan, Bedford, NH (US)

(73) Assignee: 4D Technologies, LLC, Bedford, NH (US)

( * ) Notice: Subject to any disclaimer, the term of this patent is extended or adjusted under 35 U.S.C. 154(b) by 251 days.

(21) Appl. No.: 16/117,200

(22) Filed: Aug. 30, 2018

(65) Prior Publication Data

US 2019/0066031 A1 Feb. 28, 2019

Related U.S. Application Data

(63) Continuation of application No. 16/117,078, filed on Aug. 30, 2018, and a continuation of application No. 16/117,135, filed on Aug. 30, 2018.

(60) Provisional application No. 62/551,912, filed on Aug. 30, 2017, provisional application No. 62/551,919, filed on Aug. 30, 2017, provisional application No. 62/551,929, filed on Aug. 30, 2017.

(51) Int. Cl.
*G06Q 10/06* (2012.01)
*G06N 5/04* (2006.01)
*G06Q 50/20* (2012.01)

(52) U.S. Cl.
CPC ....... *G06Q 10/063118* (2013.01); *G06N 5/04* (2013.01); *G06Q 10/063112* (2013.01); *G06Q 50/2057* (2013.01); *G06Q 10/06313* (2013.01)

(58) Field of Classification Search
CPC ............. G06N 5/04; G06Q 10/063112; G06Q 10/063118; G06Q 10/06313; G06Q 50/2057
USPC ....................................................... 705/7.14
See application file for complete search history.

(56) References Cited

U.S. PATENT DOCUMENTS 10,515,076 B1 * 12/2019 Wiegand ............... G06F 16/243
2012/0226617 A1 * 9/2012 Kay ..................... G06Q 10/105
705/301
2012/0303614 A1 * 11/2012 Mercuri ............... G06Q 10/101
707/723

(Continued)

*Primary Examiner* — Folashade Anderson
(74) *Attorney, Agent, or Firm* — Ascentage Patent Law, LLC; Travis Lee Johnson

(57) ABSTRACT

Contemplated herein is a system and method for answering user queries, the system and method including a tracked user skill database, a historical database, and a training content database wherein processing circuitry can determine a tool being utilized by a user; receive a user input query; tokenize the user input query and associate one or more tokens with the user input query; and search the databases so as to match the query with content within the databases. The system can then present potential matches to the user and receiving input regarding user satisfaction with regard to the potential matches presented. If the answer is not satisfactory the system can then analyze the tracked user skill database for user profiles indicating proficiency in the matched feature of the query.

22 Claims, 5 Drawing Sheets

(56) References Cited

U.S. PATENT DOCUMENTS

| | | | | |
|---|---|---|---|---|
| 2016/0104096 A1* | 4/2016 | Ovick | ............ | G06Q 10/063112 |
| | | | | 705/7.14 |
| 2016/0104260 A1* | 4/2016 | Menrad | .............. | G06Q 50/2057 |
| | | | | 705/328 |
| 2017/0228372 A1* | 8/2017 | Moreno | .............. | G06F 16/3329 |
| 2020/0034441 A1* | 1/2020 | Hewitt | ................ | G06F 16/9535 |

* cited by examiner

AUTOMATIC UPDATING INTERACTIVE QUERY ANSWERING AND FEATURE TRAINING METHOD AND SYSTEM

PRIORITY CLAIM

This patent application claims priority to U.S. Provisional Application No. 62/551,912 filed on Aug. 30, 2017; U.S. Provisional Application 62/551,919 filed on Aug. 30, 2017; U.S. Provisional Application 62/551,929 filed on Aug. 30, 2017; Non-Provisional application Ser. No. 16/117,078 filed on Aug. 30, 2018; and Non-Provisional application Ser. No. 16/117,135 filed on Aug. 30, 2018 all of which are hereby incorporated by reference in their entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

1. Field of the Invention

The disclosure relates to methods and systems for providing aid and answering user questions in within a software platform.

2. Description of the Prior Art

In the workplace, multiple users will often be required to utilize particular tools or software programs wherein various user's will inherently gain expertise in a particular feature set within each tool through continued use and thus develop a unique expertise profile. Each user's expertise profile will vary between user's and inherently different users will become more proficient in various features than others. It is also well understood that various features and how to use them can often be found within a help tool or instructional database associated with a particular software application. It is also understood that the help tools and databases can often be inefficient and burdensome to use, which can result in wasting numerous man hours while finding answers, or by doing certain tasks using less efficient methods due to ignorance or merely through the inaccessibility of the answers to certain questions.

SUMMARY

In order to improve employee efficiency and increase training and question answering effectiveness an automatic updating interactive query answering and feature training system is contemplated herein which can include background application or even a plug-in application installed directly in a target tool or software application. The application can then be configured to monitor the tool usage based on detected actions, i.e. clicks, key strokes, motions, etc., and extract information therefrom which can then be utilized to determine the various functions which the user regularly uses within respect to the tool. Additionally, based on the clicks and key strokes, as well as in conjunction with workflows within the system, the speed and accuracy of the given workflow and its associated competencies can then be determined so as to identify experts with regard to specific competencies for any given function or usage within the particular tool. Then when alternative users encounter questions during software or tool use the system can attempt to answer the question automatically, but failing that, can then connect the user with tracked and quantified experts with regard to various tools and features within those tools.

In order to achieve these and other functions, contemplated herein is an automatic updating interactive query answering and feature training system, wherein the system includes: a tracked expert skill database containing a plurality of expert profiles each having associated expert skill proficiency data regarding each expert's individual proficiencies associated with one or more tools; a historical database containing one or more historical answers associated with one or more historical queries; a non-transitory computer-readable medium containing one or more sets of computer instructions; and one or more one or more processors configured to implement the one or more sets of computer instructions from the non-transitory computer readable medium.

The one or more processors can then be instructed or otherwise configured to perform the following tasks: receive a user input query associated with a particular tool; tokenize the user input query into one or more query tokens; compare the one or more query tokens with one or more historical question tokens associated with one or more historical answers; determine a relevance score between the one or more query tokens and the one or more historical question tokens associated with one or more historical answers; generate a list of potential answers based on the relevance scores; query user if any of the potential answers are acceptable; and determine matches between the one or more query tokens and the expert skill proficiency data associated with the plurality of expert profiles. Further, in some such embodiments, the system can then connect an available expert associated with the determined matches with the user.

In some embodiments the expert skill proficiency data can include information regarding a given expert's proficiency associated with one or more features associated with the one or more tools. Further, in some such embodiments, the computer instructions can further include instructions to perform the following tasks: determine matches between the query tokens and the one or more tool features thus indicating one or more matched tool features; analyze the tracked expert skill database for expert profiles indicating particular experts having proficiency in the one or more matched tool features of the tool thus indicating one or more subject matter experts; determine a match between one or more subject matter experts having proficiency with the one or more matched tool features and the query tokens; and present a list of matched subject matter experts to the user, each matched subject matter expert being provided with a match ranking, the match ranking indicating a highest likely expertise matching the query tokens.

It will be appreciated that in some instances the tool being utilized by a user can be automatically determined, such as when a query is initiated or asked from an in-tool plugin, alternatively the query can be initiated via a generic or non-tool specific portal wherein a tool can be determined by requiring input from the user, either initially or through clarifying questions.

In some additional supplemental or alternative embodiments, the system can be configured to track recent tool features utilized by the user associated with a particular tool wherein the determination of a match between one or more subject matter experts having proficiency with the one or more matched tool features and the query tokens also increases the match ranking score of a particular subject matter expert when the subject matter expert also has proficiency associated with the recent tool features utilized by the user.

In some embodiments it may be necessary for the system to determine a need to receive from the user additional refining or clarifying input regarding the user input query; present one or more refining questions to the user; receive from the user additional refining input in response to the one or more refining questions; and tokenize the additional refining input from the user into one or more refining tokens. In some such embodiments the one or more refining tokens can then be used in addition to the one or more query tokens to determine matches between the one or more query and refining tokens and the expert skill proficiency data associated with the plurality of expert profiles. In addition, these refining tokens can then be used in conjunction with the one or more matched tools and query tokens to determine a match to an associated subject matter expert.

In any of the embodiments discussed herein, the system can then be utilized to initiate a dialogue request between a particular matched subject matter expert and the user.

In some additional embodiments the computer instructions can also include instructions to create a new historical answer based on the user's acceptance of information provided to the user from the subject matter expert. In some such embodiments, the system can then tokenize the new historical answer; and compare the new historical answer tokens to a database of tokenized historical answers, wherein the system will then associate the new tokenized historical answer with one or more historical question tokens In some embodiments the subject matter experts matched based on the query can be categorized based on whether each subject matter expert is internally employed by a common entity as the user, or whether the subject matter expert is an external employee not being employed by a common entity as the user.

In some additional embodiments the system can be configured to track one or more expert interactions with the one or more tools while providing an answer to the user input query; associate one or more answer tokens with the one or more expert interactions; and update the user skill proficiency data associated with an associated specific user skill within the tracked user skill database based on the one or more answer tokens.

In yet additional embodiments the system can track one or more subject matter expert interactions of a matched subject matter expert, the subject matter expert interactions relating to the particular tool being utilized by the user while providing an answer to the user input query. This tracked subject matter expert interactions can then be utilized to create a new historical answer based on the subject matter expert interactions with the tool being utilized by the user while answering the user input query wherein the system can then associate the new historical answer with the one or more query tokens which were originally tokenized from the user input query. It will be appreciated that the system can then update the historical database with the new historical answer so as to allow for future retrieval of the new historical answer in response to similar queries.

In some additional embodiments, the system can present a transcript of a dialogue containing an accepted answer by the user from the matched subject matter expert to an authoritative subject matter expert; receive formalization input from the authoritative subject matter expert so as to formalize the transcript into a new historical answer. The system can then tokenize the new formalized historical answer received from the authoritative subject matter expert; and ultimately include the new historical answer in the historical database. In some such embodiments the system can then tokenize the new historical answer; compare the newly tokenized historical answer with other historical answer tokens and historical question tokens; and associate the newly tokenized historical with one or more historical answer tokens or historical question tokens.

In order to determine expertise or proficiency, in some embodiments, the system can track one or more expert's received training associated with at least one tool; and update the expert skill proficiencies associated with an associated specific expert skill within the tracked user skill database based on the associated expert's received training. In other embodiments prospective experts can gain expertise level by performing or completing assessments associated with one or more tool features or queries. In yet additional embodiments prospective experts can gain expertise level through repetitive use of a particular tool and tracking of used functions within that particular tool.

In some embodiments, the matches between the query tokens and one or more question tokens having associated historical answers to historical queries are generated based on a match score. In some such embodiments when the match score is below a threshold score the query can be flagged and assigned to one or more subject matter experts with instructions or an assignment to generate a historical answer matching the input query.

In some instances, the system can allow the user to define the project that they are working on at any given time, to link activity to a given product.

In some instances, the system can be directly linked to materials that are specific for the given tool and potentially version (i.e. AutoCAD™ 2018 vs. AutoCAD™ 2014).

A training database having one or more live learning materials can then be automatically suggested to particular users based on the recognized activity of the user within a particular tool, wherein the learning materials can be presented on a palette or other presentation avenue within the target tool.

In some embodiments, the training materials can be presented to the user in the application, or alternatively in a browser of the operating system, on a desktop application, or within a mobile application on a smart device.

As the user uses the system, the system can automatically determine which workflows or features the user is executing and offers to assist and show them where they are in the process and how the user can be more efficient. Alternatively, the user can specify their workflow or function and make a request for interactive assistance.

The system can then recognize when assistance is being given, determine whether the assistance offered is utilized and automatically update the database and associated search inquiries so as to determine a correlation between successful trainings, or assistances to particular terms used in queries. Then using all of this data, as questions are subsequently and iteratively asked and answered the system can then determine the most likely answer to a given question due to the highly contextual model within a particular tool and thus the accuracy of the question and associated answer can be greatly increased.

DETAILED DESCRIPTION

Figure 1:
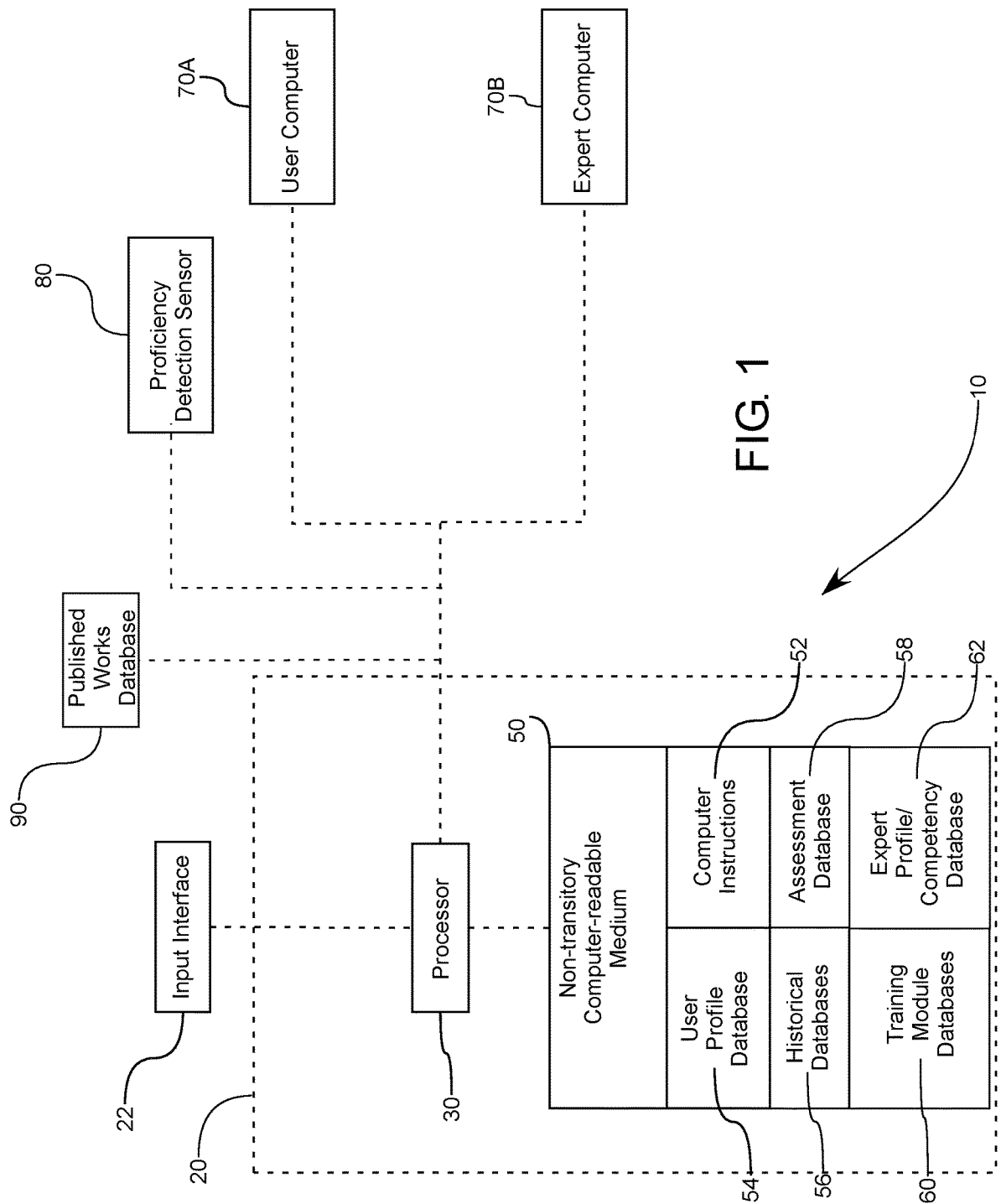
FIG. 1 illustrates an exemplary schematic of an automatic updating interactive query answering and feature training system.
Figure 2:
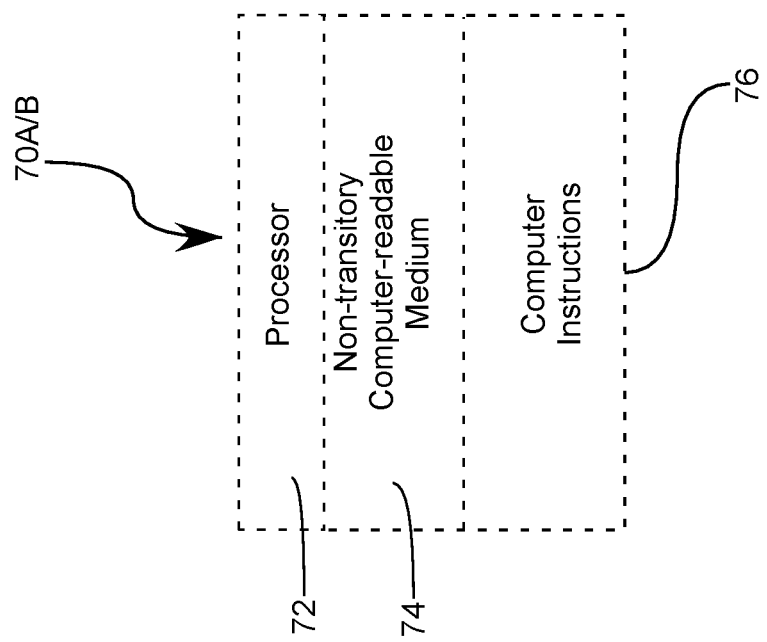
FIG. 2 illustrates an exemplary schematic of a user or expert computer or portal component for use in conjunction with the automatic updating interactive query answering and feature training system of FIG. 1.
Figure 3:
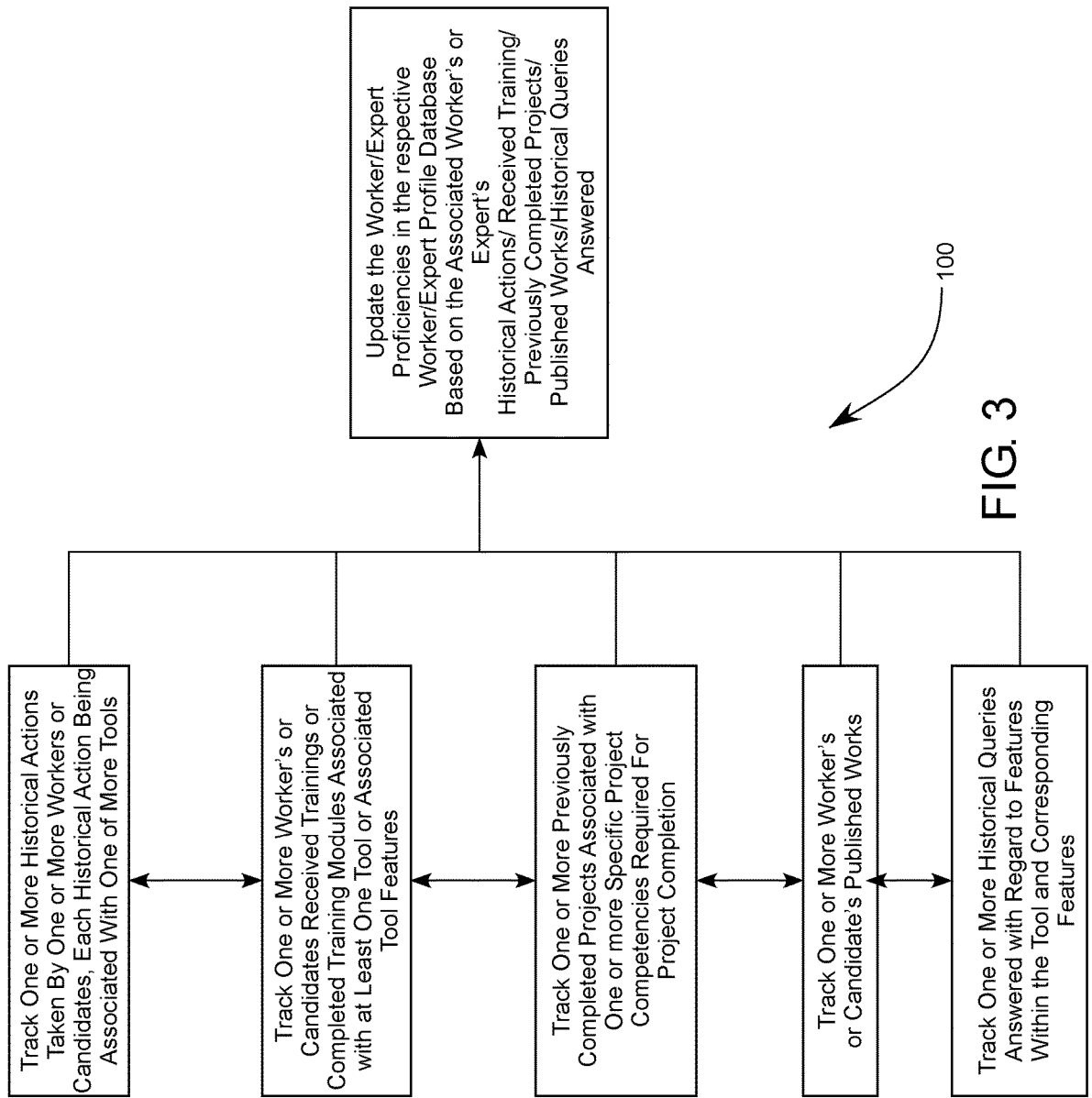
FIG. 3 illustrates a flow chart illustrating various method steps as part of the method and system in accordance with various aspects of the automatic updating interactive query answering and feature training system.
Figure 4:
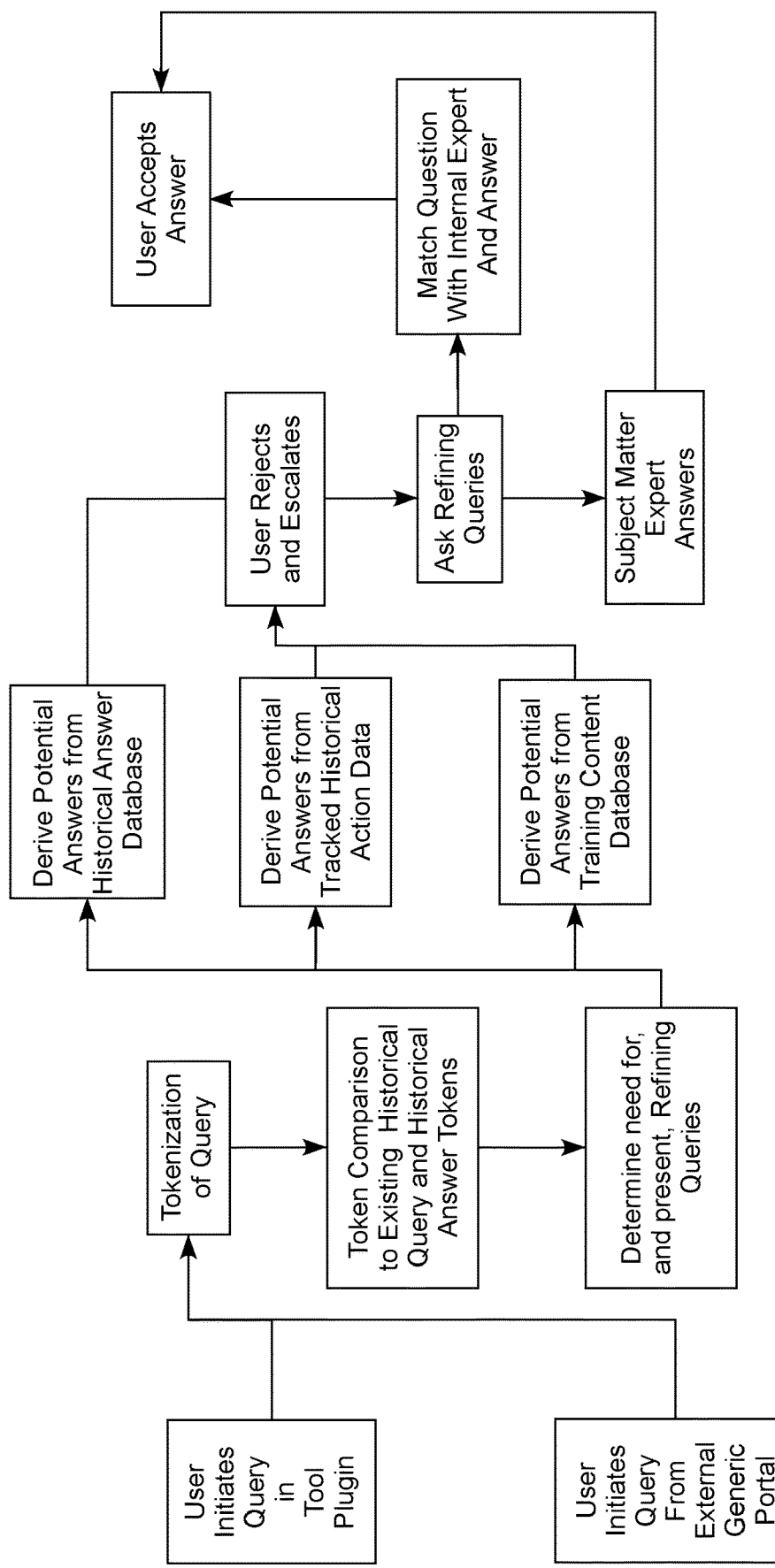
FIG. 4 illustrates yet another alternative flow chart illustrating various method steps as part of the automatic updating interactive query answering and feature training system and methods in accordance with various aspects of the present invention.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

As discussed above a method and system are contemplated herein which seek to increase user efficiency, and thus project efficiency, as well as optimize skill usage within a company so as to increase turnaround speed for assignments, as well as increase deliverable quality.

In particular, the system 10 can include a user interface 22 configured to receive user input regarding one or more project parameters, the one or more project parameters including information regarding one or more necessary competencies for project completion. The system can also include a non-transitory computer-readable medium 50 containing one or more sets of computer instructions 52 and one or more processors 30/72 configured to implement the one or more sets of computer instructions 52. The non-transitory computer-readable medium 50 can also include a user profile database 54 which can contain a plurality of user profiles, wherein each profile contains information regarding tracked user skill proficiencies associated with one or more particular user proficiencies.

While, in some instances the processor 30 and non-transitory computer readable medium 50 can be provided on a remote server 20 where the input interface interacts through a wireless or network connection in order to receive input, in some alternative instances the input interface can be integrally provided with the server 20 and input received directly and locally.

In some embodiments the system 10 can be provided with one or more historical databases 56, User profile databases 54, candidate profile or competency databases 62, and expert profile or competency databases 62, wherein these databases can receive and track user and expert actions, training modules, assessments, project histories, etc. wherein the historical database can then be utilized to track user and expert interactions, extract the competencies demonstrated through these interactions, and then update each users's or expert's associated profile within the respective user profile database or expert profile database so as to allow for an iteratively updated competency profile for each user or expert.

It will be understood that the methods and processes discussed herein can be performed by a remote system 10 or be installed as a local program or plug-ins on a local computer either on a user computer 70A or on an expert's computer 70B wherein the local processors 72, non-transitory computer-readable mediums 74, can include instructions 76 to perform all or some of the tasks discussed herein. Alternatively, the system 10 can include a remote server with a remote processor 30 with a remote non-transitory computer-readable medium 50 having computer instructions 52 configured to receive requests and queries remotely and perform all or some of the functions, store information, etc., on the remote server.

As contemplated herein the computer instructions, 52 or 76, can include instructions for the one or more processors, 30 or 72, to determine which tools are being utilized by the user or on a particular user's computer 70A. The system can then receive a query, which can be received using input text, voice recognition, etc., and translation to text. The text, in conjunction with the known tool or software product can then be analyzed so as to match the query with one or more answers or tutorials regarding the subject or keywords found in the text.

In some embodiments, the query itself can be tokenized, or in other words the query can be translated into text and broken up into a sequence of strings which can include various pieces such as words, keywords, phrases, symbols and other elements commonly referred to as tokens. Tokens can be individual words, phrases or even whole sentences. Additionally, the tokenization can break the sentences into component parts so as to separate verbs, adverbs, nouns etc., so as to better recognize case tenses, and thus have a better chance of recognizing the proper context of the question. Further; in the process of tokenization, some characters like punctuation marks are discarded as well as conjunctive words which do not add value to the specific tokens. The tokens are then used as the input for the searching and matching process of historical databases or previously generated trainings, etc. so as to find matches. The tokens of the query can then be associated with particular answers within the database to later increase searching accuracy based on similar tokens.

Users can ask questions directly and the system will employ contextual awareness based on particular tools or programs being run simultaneously on the computer and the text of the query in order to search a targeted database of information to answer the question, if possible. If the system cannot answer the question satisfactorily, it will escalate to an expert based on the expert's competencies. Organizations can allow escalation to their own internal staff to automatically have questions directed internally, based on the statistical probability of their ability to answer it. Alternatively, questions can be escalated to external subject matter experts to external professionals or experts in the particular tool.

Once the question is answered to the questioning user's satisfaction, either by the database search or by escalation to an internal or external human subject matter expert, the system can record the actions of the user or the subject matter expert and include the actions and instructions in the target answer/training database so as to enable answering of that question and similar questions in the future, creating value for the company in optimization of the answering and associated training process.

The one or more processors can then be instructed or otherwise configured to perform the following tasks: receive a user input query associated with a particular tool; tokenize the user input query into one or more query tokens; compare the one or more query tokens with one or more historical question tokens associated with one or more historical answers; determine a relevance score between the one or more query tokens and the one or more historical question tokens associated with one or more historical answers; generate a list of potential answers based on the relevance scores; query user if any of the potential answers are acceptable; and determine matches between the one or more query tokens and the expert skill proficiency data associated with the plurality of expert profiles. Further, in some such embodiments, the system can then connect an available expert associated with the determined matches with the user.

In some embodiments the expert skill proficiency data can include information regarding a given expert's proficiency associated with one or more features associated with the one or more tools. Further, in some such embodiments, the computer instructions can further include instructions to perform the following tasks: determine matches between the query tokens and the one or more tool features thus indicating one or more matched tool features; analyze the tracked expert skill database for expert profiles indicating particular experts having proficiency in the one or more matched tool features of the tool thus indicating one or more subject matter experts; determine a match between one or more subject matter experts having proficiency with the one or more matched tool features and the query tokens; and present a list of matched subject matter experts to the user, each matched subject matter expert being provided with a match ranking, the match ranking indicating a highest likely expertise matching the query tokens.

It will be appreciated that in some instances the tool being utilized by a user can be automatically determined, such as when a query is initiated or asked from an in-tool plugin, alternatively the query can be initiated via a generic or non-tool specific portal wherein a tool can be determined by requiring input from the user, either initially or through clarifying questions.

In some additional supplemental or alternative embodiments, the system can be configured to track recent tool features utilized by the user associated with a particular tool wherein the determination of a match between one or more subject matter experts having proficiency with the one or more matched tool features and the query tokens also increases the match ranking score of a particular subject matter expert when the subject matter expert also has proficiency associated with the recent tool features utilized by the user.

In some embodiments it may be necessary for the system to determine a need to receive from the user additional refining or clarifying input regarding the user input query; present one or more refining questions to the user; receive from the user additional refining input in response to the one or more refining questions; and tokenize the additional refining input from the user into one or more refining tokens. In some such embodiments the one or more refining tokens can then be used in addition to the one or more query tokens to determine matches between the one or more query and refining tokens and the expert skill proficiency data associated with the plurality of expert profiles. In addition, these refining tokens can then be used in conjunction with the one or more matched tools and query tokens to determine a match to an associated subject matter expert.

In any of the embodiments discussed herein, the system can then be utilized to initiate a dialogue request between a particular matched subject matter expert and the user.

In some additional embodiments the computer instructions can also include instructions to create a new historical answer based on the user's acceptance of information provided to the user from the subject matter expert. In some such embodiments, the system can then tokenize the new historical answer; and compare the new historical answer tokens to a database of tokenized historical answers, wherein the system will then associate the new tokenized historical answer with one or more historical question tokens In some embodiments the subject matter experts matched based on the query can be categorized based on whether each subject matter expert is internally employed by a common entity as the user, or whether the subject matter expert is an external employee not being employed by a common entity as the user.

In some additional embodiments the system can be configured to track one or more expert interactions with the one or more tools while providing an answer to the user input query; associate one or more answer tokens with the one or more expert interactions; and update the user skill proficiency data associated with an associated specific user skill within the tracked user skill database based on the one or more answer tokens.

In yet additional embodiments the system can track one or more subject matter expert interactions of a matched subject matter expert, the subject matter expert interactions relating to the particular tool being utilized by the user while providing an answer to the user input query. This tracked subject matter expert interactions can then be utilized to create a new historical answer based on the subject matter expert interactions with the tool being utilized by the user while answering the user input query wherein the system can then associate the new historical answer with the one or more query tokens which were originally tokenized from the user input query. It will be appreciated that the system can then update the historical database with the new historical answer so as to allow for future retrieval of the new historical answer in response to similar queries.

In some additional embodiments, the system can present a transcript of a dialogue containing an accepted answer by the user from the matched subject matter expert to an authoritative subject matter expert; receive formalization input from the authoritative subject matter expert so as to formalize the transcript into a new historical answer. The system can then tokenize the new formalized historical answer received from the authoritative subject matter expert; and ultimately include the new historical answer in the historical database. In some such embodiments the system can then tokenize the new historical answer; compare the newly tokenized historical answer with other historical answer tokens and historical question tokens; and associate the newly tokenized historical with one or more historical answer tokens or historical question tokens.

In order to determine expertise or proficiency, in some embodiments, the system can track one or more expert's received training associated with at least one tool; and update the expert skill proficiencies associated with an associated specific expert skill within the tracked user skill database based on the associated expert's received training. In other embodiments prospective experts can gain expertise level by performing or completing assessments associated with one or more tool features or queries. In yet additional embodiments prospective experts can gain expertise level through repetitive use of a particular tool and tracking of used functions within that particular tool.

In yet additional embodiments the computer instructions can further include instructions to access or store a published works database 90, wherein the published works database contains information relating to one or more published works generated by one or more particular experts, wherein the one or more published works are associated with one or more tracked expert skill proficiencies. The one or more processors can then be configured to track generation of one or more published works by one or more experts and update each expert's profile and particular expert skill proficiency information based on the generation of published works. In some such embodiments, the probability match of each expert can be affected by the published works from a plurality of categories, which can include peer reviewed third-party publications; non-reviewed third-party publications; and self-publications. It will be appreciated that publications can have differing levels of authority based on the level of scrutiny required and that peer reviewed publications might establish one as an authority on a topic. Meanwhile, some journals or publications, while not necessarily peer reviewed might give more authority than others. Finally, self-published means, like websites or blogs, might be accurate, but ultimately have less authoritative weight. In some instances, the system may also be configured to track public reception by other experts and adjust the ultimate weight of publications on the particular expert's skill proficiency, competency, etc., according to such positive or negative peer treatment.

In some embodiments, the matches between the query tokens and one or more question tokens having associated historical answers to historical queries are generated based on a match score. In some such embodiments when the match score is below a threshold score the query can be flagged and assigned to one or more subject matter experts with instructions or an assignment to generate a historical answer matching the input query.

In some instances, the system can allow the user to define the project that they are working on at any given time, to link activity to a given product.

In some instances, the system can be directly linked to materials that are specific for the given tool and potentially version (i.e. AutoCAD™ 2018 vs. AutoCAD™ 2014).

A training database having one or more live learning materials can then be automatically suggested to particular users based on the recognized activity of the user within a particular tool, wherein the learning materials can be presented on a palette or other presentation avenue within the target tool.

In some embodiments, the training materials can be presented to the user in the application, or alternatively in a browser of the operating system, on a desktop application, or within a mobile application on a smart device.

As the user uses the system, the system can automatically determine which workflows or features the user is executing and offers to assist and show them where they are in the process and how the user can be more efficient. Alternatively, the user can specify their workflow or function and make a request for interactive assistance.

The system can then recognize when assistance is being given, determine whether the assistance offered is utilized and automatically update the database and associated search inquiries so as to determine a correlation between successful trainings, or assistances to particular terms used in queries. Then using all of this data, as questions are subsequently and iteratively asked and answered the system can then determine the most likely answer to a given question due to the highly contextual model within a particular tool and thus the accuracy of the question and associated answer can be greatly increased.

Additionally, in some instances, the system can further incorporate a question and answer feedback loop which then allows the system to further refine its modeling and also ask refining questions to provide more precise answers in a more effective manner going forward.

In some instances, the subject matter expert can also manually prepare or edit the recorded actions and incorporate them as lessons or trainings regarding the question/query and upload it to a training database such that it can be easily accessed for future similar queries and limit the amount of time demanded of the subject matter experts over time.

The system 10 can also be provided with, or access to, a tracked user skill database (54, 56, 58, 60, 62), which contains a plurality of user profiles corresponding to various users within the company, etc. In some embodiments, the tracked user skill database (54, 56, 58, 60, 62) can be provided on a local non-transitory computer-readable medium 50, however, alternatively the tracked user skill database can be stored separately and merely accessed from a known location by the one or more processors 30. In any case, the system 10 can access and analyze information regarding each of a plurality of user's particular skill sets, tool proficiencies, tool commands and functions with which each user is familiar, has had training, or regularly uses, etc.

The system can then be configured to track keystrokes and command functions performed by the user with regard to a particular tool or application which can then be used to populate associated user skill proficiencies for various tools, software types, brands, functions, etc., within the tracked user skill database. In this manner, the system can determine which commands and functions with which each user is proficient with regard to a particular tool and to what degree the user is proficient. After a certain threshold is met, a particular user can then be recognized as a subject matter expert with regard to certain functions or skills within a given program, and as such be indicative of a person who is capable of asking particular questions regarding those functions or skills.

It will be appreciated that in some instances, the system can be configured to operate as an add-on, or a background module provided in the one or more programs, or alternatively as a separate program entirely on the user's particular computer 70A. In this manner, the system can be utilized to track user behavior and automatically modify or update the tracked user skill database based on user behavior. For example, a design program can be provided with an add-on which tracks functions, features, commands, keystrokes, hotkeys used, or any other potential function within a program, and the frequency of use, or the methodologies for activating the command can be tracked and utilized for assessing proficiency. For purposes of illustration, if a particular user regularly uses a strength analysis function in a design program, the use of that function can be tracked, and through repeated use it can then be assumed that the particular user is proficient in using that particular command or function. Alternatively, if a command which has an associated hotkey or shortcut is regularly used, but an inefficient menu is utilized for activating the command, it can then be determined that the user could benefit from additional hotkey training for that function.

As such, the use of that command or function can then be recognized by the program, add-on, and reported for inclusion in the tracked user skill database and associated with the particular user's skillset.

Further, as an inefficiency is recognized, the system can suggest a training which would increase their efficiency.

Alternatively, if a user is utilizing the tool, and needs to use a new function, but is unsure how, the user can initiate a question, such as by pressing a help icon provided in a toolbar. The user can then input the query regarding the desired command using specific or natural language either typed or spoken to a voice assistant or recognition program.

The system can then do a search based on the query and provide a list of potential answers to the query based on text or token matching with a weighted match score. The user can then select one or more answers, wherein the answers can include trainings, tutorials, walkthroughs, etc., and read the answer or perform tasks which illustrate the use of the particular function related to the query.

The system can then prompt the user to indicate whether the query was answered satisfactorily. If yes, the system can record the query and the satisfactory answer in the database and associate a successful answer to the words and subject of the query, so as to build a database which is more likely to provide satisfactory answers to related queries in the future. If not, then the system can flag the query for escalation, wherein escalation indicates the need for one of several options. A first option would be to ask additional refining questions and receive input from the user so as to generate more query text content and search for a more appropriate pre-existing response. A second option is to flag the query for presentation to a live subject matter expert.

In some instances, associations between the final acceptable answer and the terms of the query can be incorporated into the historical database such that the system can iteratively learn for the next time that question or similar is asked because it creates a Bayesian table so as to increase probability of a correct answer based on the weighted statistical likelihood that a particular term used in the query and is associated with one or more particular answers.

As discussed above, the system can include a tracked user skill database which tracks usage of a plurality of users of the particular tool as well as user use of commands within the tool or software. The system then determines which users regularly use particular commands and strokes within a given program. As such users increase their usage of particular commands their relative strength, or expertise in those commands is then determined based on usage. Escalation of a query related to a particular command can then result in the system matching and making a recommendation to the user asking the query with another user having a subject matter expertise with regard to commands relating to the particular query.

In some cases, the system can initiate contact between the user making the query and the subject matter expert, or the system can merely provide a recommendation of various subject matter experts in the related commands or subject of the query. For purposes of illustration, the system can be configured to return a suggestion to the user "if you are having trouble doing fatigue analysis on modeled parts, here is a list of internal company users who regularly perform similar analysis . . . " or "here is a list of external tool users who regularly perform similar analysis . . . ".

In some instances, the system can also automatically initiate a chat or call with a subject matter expert so as to resolve the user's query.

It will be appreciated that the system can also be configured to track user and subject matter expert actions while the query is still active and not closed by the user. Keystrokes, menu selections, commands, and./or work flows can then be recorded and saved in the answer database and correlated with the terms used in the query so as to build a more complete answer database wherein the steps or actions taken in response to the query can then be presented to future users using similar query terms.

It will also be appreciated that queries can be initiated from multiple sources such as voice commands, search bars, etc.

In some instances, tokenization of the particular query can be utilized wherein the system takes the question and builds an expression tree of the sentence structure using a machine learning text system. This tokenization can allow for statistical comparison to existing questions, similarity assessed, and thus to applicable answers in the training database such that the system can retrieve a direct pre-existing response so as to answer the query directly. If a direct answer is found then the query can be closed and the system can associate answers related to the tokens of the query such that the system can utilize the stored answer and the tokenized text for all future questions. If no satisfactory answer is found, the system can also search through pre-existing developer provided training content in order to find possible answers in the text. If an answer is then found, the tokens of the query can also trigger future users to the developer provided training content. Then, finally, if no satisfactory answers are found a feedback loop with the user can be again be initiated and escalated to subject matter experts.

It will be appreciated that in the case of initiation of communication with a subject matter expert that a particular subject matter expert may not be able to answer immediately. In such a case, the system can be configured to generate an email or text message outlining the query and requesting a response from the subject matter expert.

The system can also be configured to utilize live communication methods such as voice over IP or another chat system (including on website) to escalate to internal or external subject matter experts and create an interactive process of refinement to allow the question to be answered.

In some embodiments, each particular user skill can be provided with an associated competency, wherein calculation of their competency score can be provided as a weighted score based on the commands they use, the lesson's or trainings they have viewed or received, questions previously asked, or completion of previous tasks requiring competency in a given skill. Based on these factors, a weighted average of their particular competency score can be assessed with a breakdown for each competency with potential strengths and potential weaknesses. The term "potential" essentially outlining a difference in that a weak score associated with having little or no data differs from a weak score based on incorrect or misuse of various commands.

Matches with respect to the particular query and potential subject matter experts can then be presented to the user based on the most qualified to the least, allowing the subject matter expert to take the question and then answer it. If they cannot answer it, or if the questioner is not satisfied, they can mark it as such, which will drop it back into the pool of answer candidates and update the statistical model of the failed subject matter expert for the future potential matching with respect to subject of the category or subject matter of the query.

It will be further appreciated that the system can also be configured to determine a best subject matter expert in a manner that makes recommendations based on numerous parameters, such as cost of external subject matter experts vs. cost of internal subject matter experts, availability, number of projects in queue, workload, pay rates, etc.

It will be further appreciated that an interactive and automatic updating method for query answering and feature training is contemplated herein, wherein the steps can be performed without a particular underlying system. This method is illustrated in-part by flowcharts 100, 200, in FIGS.

3-4, wherein the steps performed by the system above can be performed without the recited hardware of the system. As such the method can include the steps of: providing a tracked expert skill database containing a plurality of expert profiles having associated expert skill proficiency data regarding each expert's individual proficiencies associated with one or more tools; providing a historical database containing one or more historical answers associated with one or more historical queries; receiving a user input query associated with a particular tool; tokenizing the user input query into one or more query tokens; comparing the one or more query tokens with one or more historical question tokens associated with one or more historical answers; determining a relevance score between the one or more query tokens and the one or more historical question tokens associated with one or more historical answers; generating a list of potential answers based on the relevance scores; and determining matches between the query tokens and the expert skill proficiency data associated with one or more tools for a plurality of expert profiles. It should be appreciated that the list of potential answers can be provided from historical answers and similar historical questions associated therewith, but can also be provided from training content which has been imported into the system, tokenized, and associated with various similar query tokens.

The method can also include a step of receiving input regarding user satisfaction with regard to the list of potential answers. For example, if the user receives a list of tokenized potential answers but is not finding a satisfactory answer, the user can then choose to escalate to connect with an expert. Alternatively, the satisfaction can be assumed to be insufficient by repetitive queries, selecting an abundance of answers, repeated selection of potential answers and returns to the listings, etc.

In some embodiments, and as discussed above, the tracked expert skill proficiency can include information regarding proficiency associated with regard to one or more tool features rather than just to a particular tool. It will be understood that a particular tool may have hundreds, if not thousands, of features, and as such, a mere relative proficiency with a tool, will not always equate to proficiency with regard to a particular feature of said tool. For example, a particular smartphone may vary greatly with regard to another brand smartphone, but further each smartphone may have tens of thousands of potential features, wherein it would be virtually impossible for a single expert or user to be an expert on all functions. Instead, the system or method can include the ability to track user interactions of users or experts with various features, recognize the historical interactions of the expert with said functions, and then recognize proficiency with said features based on historical usage for connecting the expert with user's requesting help with those particular features of the tool.

In order to achieve this function, the method can include the following steps: determining matches between the query tokens and the one or more tool features thus indicating one or more matched tool features; analyzing the tracked expert skill database for expert profiles indicating particular experts having proficiency in the one or more matched tool features of the tool thus indicating one or more subject matter experts; determining a match between one or more subject matter experts having proficiency with the one or more matched tool features and the query tokens; and presenting a list of matched subject matter experts to the user, each matched subject matter expert being provided with a match ranking, the match ranking indicating a highest likely expertise matching the query tokens, wherein the tracked expert skill proficiency data includes information regarding proficiency associated with one or more tool features.

In some embodiments the method can also include the steps of: determining matches between the query tokens and the one or more tool features thus indicating one or more matched tool features; analyzing the tracked expert skill database for expert profiles indicating particular experts having proficiency in the one or more matched tool features of the tool thus indicating one or more subject matter experts; determining a match between one or more subject matter experts having proficiency with the one or more matched tool features and the query tokens; and presenting a list of matched subject matter experts to the user, each matched subject matter expert being provided with a match ranking, the match ranking indicating a highest likely expertise matching the query tokens.

In yet additional embodiments the method can include the steps of: providing a training content database containing one or more tutorials or trainings regarding one or more tool features associated with the one or more one or more tools; comparing the query tokens with one or more pre-existing training tokens associated with one or more tutorials or trainings in the training content database and tracking recent tool features utilized by the user associated with a particular tool. In some such embodiments, the step of determining a match between one or more subject matter experts having proficiency with the one or more matched tool features is also based in part on recent tool features utilized by the user.

For example, if a user has been recently performing an animation function in a 3-D modeling software, and then begins a query for which the system is unable to automatically provide a satisfactory answer, the system will include the recently used function of animation in the query tokens for finding a matching expert when listing highest probabilistic match between the query tokens and the various subject matter experts.

In some embodiments the method can also include the steps of: determining a need to receive additional clarifying user input regarding the user input query; presenting one or more refining questions to the user; receiving additional input with regard to the one or more refining questions; and tokenizing the additional input from the user.

For example, if a user initiates a query, and the particular query tokens extracted from the query text yield results from a plurality of categories with relatively low match scores, the system can then be instructed to ask targeted clarifying questions which can reduce the matched categories. Or, alternatively, another example might be where a user accesses the system from a non-particular portal, or without a particular recognized tool running on their particular computer, and thus no-tool particular tool is detected by the system. In such a case where the user fails to specify a particular tool or version in the query, the system or method can include a step of prompting the user for clarifying input. This step can be performed automatically by the system, manually by a selected subject matter expert, either prior to, or after, escalation of the query to subject matter expert involvement or prior to assignment to a particular subject matter expert.

It will then be appreciated that upon receipt of the clarifying or refining input from the user, that the method can include the steps of: receiving additional input with regard to the one or more refining questions; and tokenizing the additional input from the user.

At this point it will be appreciated that the method can also include the step of initiating a dialogue request between a particular matched subject matter expert and the user.

Upon initiation of the dialogue with a subject matter expert the method can include the step of transmitting a historical query transcript of the user inquiry and matched question tokens to the particular matched subject matter expert prior to the initiation of the dialogue. In this manner, prior to beginning of providing a response, the subject matter expert can read and ascertain the context of the query without requiring the user to re-explain, type, or provide all of the query history to the expert upon escalation to personal help or dialogue.

In some embodiments the method can include a step of categorizing the subject matter experts based on whether each subject matter expert is an internal employed by a common entity as the user, or whether the subject matter expert is an external subject matter expert not being employed by a common entity as the user. It will be appreciated that in some instances an external expert may require a subscription or a per/question charge, and as such a particular organization may thus give preference to internal employees. Conversely, in some instances a particular subject matter expert, even internal may be more valuable to the organization if left alone and allowed to work on currently assigned projects, and as such the interruption of said employee may also be undesirable and an external help desk service may be preferable.

In some embodiments of the present invention the method can also include the steps of: tracking one or more subject matter expert interactions of a matched subject matter expert, the subject matter expert interactions relating to the tool being utilized by the user while the subject matter expert is providing an answer to the user input query; generating a new query answer based on the subject matter expert interactions with the tool being utilized by the user while answering the user input query and associate the new answer with the tokens of the user input; and updating the historical database's associated historical answer data associated with the new answer.

In this situation the method includes the ability to automatically track the subject matter expert's actions while responding to a particular query. This tracking can then be stored in a workflow, journal, log, etc. wherein upon successfully satisfying the user's query the transcript of such can be presented to the subject matter expert for formalization, or in some instances, particularly if no formalization is necessary, the transcript can be automatically stored in one or more historical answer databases and associated with the query tokens for later searchability and potential matching with similar or common queries in the future.

In this manner, the method can include the steps of: tracking one or more subject matter expert interactions with the tool being utilized by the user while answering the user input query; creating a new answer based on the subject matter expert interactions with the tool being utilized by the user while answering the user input query and associate the new answer with the tokens of the user input query; and updating the historical database's associated historical answer data associated with the new answer.

In some embodiments, expertise can be established in a multitude of ways, some examples of such can include the steps of: tracking one or more expert's received training associated with one or more tools; and updating the expert skill proficiencies associated with an associated specific expert skill within the tracked expert skill database based on the associated expert's received training.

Alternatively, expertise can be established by tracking one or more expert's received historical usage of a tool and particular features therein. Further, expertise can be established by tracking one or more expert's publications, which can include whether the publications were peer reviewed, non-peer reviewed, the reliability of a publication source, whether the publications were self-published or published by a third party, etc. Further, expertise can be established by tracking historical answers provided by the expert, percentage of how often the expert provides satisfactory answers, the amount of time it takes for the expert to provide a satisfactory answer, or any number of metrics which will be recognized by those having skill in the art having possession of this disclosure as being relevant to a level of expertise.

In some additional embodiments the expertise score can also be adjusted based on the relative response time and the availability of the expert to answer questions.

In some additional embodiments the expertise level can be increased when a particular expert provides answer content to the historical answer database and that answer content from that expert receives positive treatment or is utilized to provide satisfactory answers in future use without the need for subsequent query escalation to a subject matter expert. In other words, one of the goals of the present method and system is to generate a robust and iteratively updated historical database that will ultimately eliminate or greatly reduce the need for personal interaction with a subject matter expert.

It will be understood that various keystrokes, hotkey usage, cursor movements, sensor input data received from one or more sensor input devices 80, etc. can be associated with various skills, sequences, motions, etc. which can then be correlated to particular proficiencies with using associate tool features. In some embodiments the processor 72 can also be configured to determine which tools are being utilized, which can be performed by determining which applications or computer programs are running on a given computer 70, or in some sensor data input situations, tool recognition can be performed using image recognition functions. Further, a user's or expert's proficiency can be determined by comparing the sensed or input data to an optimal sequence or method for completing one or more tasks in an assessment, lesson, etc.

Figure 5:
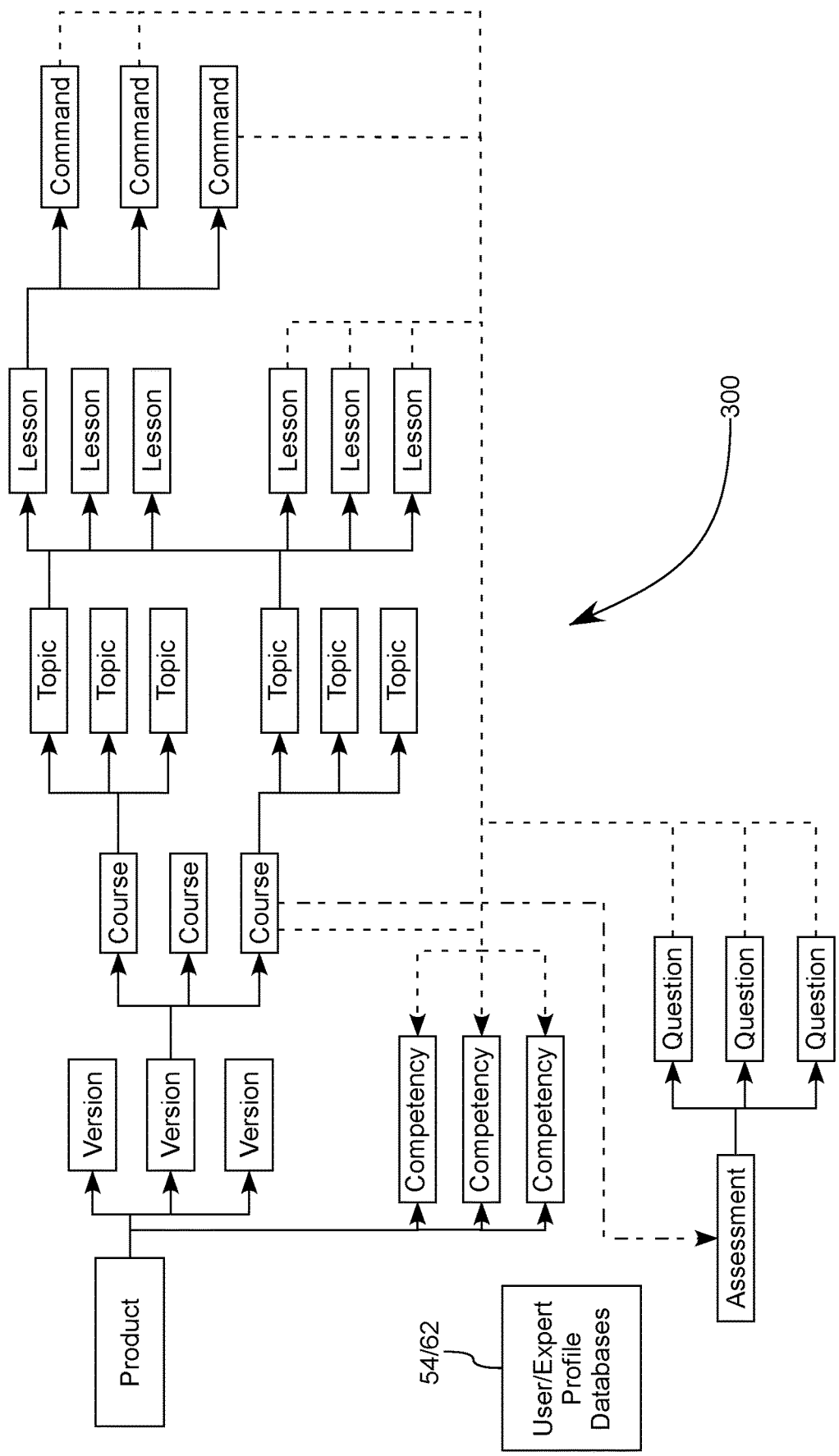
FIG. 5 illustrates a schematic of an exemplary data structure for tracking expertise or competency of various experts within the automatic updating interactive query answering and feature training system.

It will be appreciated that FIG. 5 illustrates an exemplary data structure and flow chart 300 which illustrates how various of the databases, training modules, assessments, etc., can relate back or otherwise allow the system to track competencies of user's or experts.

It is noted that no specific order is required in the aforementioned methods, though generally these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

The invention claimed is:

1. An automatic updating interactive query answering and feature training system, the system comprising:
 an automatically tracked expert skill database containing a plurality of expert profiles each having associated expert skill proficiency data regarding each expert's individual proficiencies associated with one or more tools, and wherein the individual proficiencies are based in part on tracking each expert's keystroke and cursor movement inputs into the one or more tools,
 a historical database containing one or more historical answers associated with one or more historical queries;
 a non-transitory computer-readable medium containing one or more sets of computer instructions; and
 one or more processors configured to implement the one or more sets of computer instructions from the non-transitory computer readable medium, the computer instructions containing instructions for the one or more processors to perform the following tasks:
  automatically track the tools used by a user;
  receive a user input query associated with a particular tool;
  tokenize the user input query and track tool information into one or more query tokens;
  compare the one or more query tokens with one or more historical question tokens associated with one or more historical answers;
  determine a relevance score between the one or more query tokens and the one or more historical question tokens associated with one or more historical answers;
  generate a list of potential answers based on the relevance scores;
  query user if any of the potential answers are acceptable; and
  determine matches between the one or more query tokens and the expert skill proficiency data associated with the plurality of expert profiles.

2. The system of claim 1, wherein the tracked expert skill proficiency data includes information regarding proficiency associated with one or more features associated with the one or more tools; and
 wherein the computer instructions further include instructions to perform the following tasks:
  determine matches between the query tokens and the one or more tool features thus indicating one or more matched tool features;
  analyze the tracked expert skill database for expert profiles indicating particular experts having proficiency with the one or more matched tool features of the one or more tool thus indicating one or more subject matter experts;
  determine a match between one or more subject matter experts having proficiency with the one or more matched tool features and the query tokens; and
  present a list of matched subject matter experts to the user, each matched subject matter expert being provided with a match ranking, the match ranking indicating a highest likely expertise matching the query tokens.

3. The system of claim 2, wherein the computer instructions further include instructions to perform the following task:
  determine a need to receive from the user additional refining input regarding the user input query;
  present one or more refining questions to the user;
  receive from the user additional refining input in response to the one or more refining questions; and
  tokenize the additional refining input from the user into one or more refining tokens.

4. The system of claim 3, wherein the one or more refining tokens are used with the one or more matched tools and query tokens to determine a match to the subject matter expert.

5. The system of claim 4, wherein the computer instructions further include instructions to perform the following task:
  initiate a dialogue request between a particular matched subject matter expert and the user.

6. The system of claim 5, wherein the computer instructions further include instructions to perform the following task:
  create a new historical answer based on the user's acceptance of information provided to the user from the subject matter expert.

7. The system of claim 6, wherein the computer instructions further include instructions to perform the following task:
  tokenize the new historical answer, thus creating a plurality of new historical answer tokens; and
  compare new historical answer tokens to a database of tokenized historical answers.

8. The system of claim 7, wherein the computer instructions further include instructions to perform the following task:
  associate the new tokenized historical answer with one or more historical question tokens.

9. The system of claim 5, wherein the computer instructions further include instructions to perform the following tasks:
  track one or more expert interactions with the one or more tools while providing an answer to the user input query;
  associate one or more answer tokens with the one or more expert interactions; and
  update the user skill proficiency data associated with an associated specific user skill within the tracked user skill database based on the one or more answer tokens.

10. The system of claim 5, wherein the computer instructions further include instructions to perform the following tasks:
  track one or more subject matter expert interactions of a matched subject matter expert, the subject matter expert interactions relating to the particular tool being utilized by the user while providing an answer to the user input query;
  create a new historical answer based on the subject matter expert interactions with the tool being utilized by the user while answering the user input query and associate the new historical answer with the one or more query tokens that were tokenized from the user input query; and update the historical database with the new historical answer.

11. The system of claim 5, wherein the computer instructions further include instructions to perform the following tasks:

present a transcript of a dialogue containing an accepted answer by the user from the matched subject matter expert;

receive formalization input from the matched subject matter expert so as to formalize the transcript in a new historical answer;

tokenize the new historical answer; and include the new historical answer in the historical database.

12. The system of claim 11, wherein the computer instructions further include instructions to perform the following tasks:

tokenize the new historical answer;

compare the newly tokenized historical answer with other historical answer tokens and historical question tokens; and associate the newly tokenized historical with one or more historical answer tokens or historical question tokens.

13. The system of claim 2, wherein the subject matter experts are categorized based on whether each subject matter expert is internally employed by a common entity as the user, or whether the subject matter expert is an external employee not being employed by a common entity as the user.

14. The system of claim 2, wherein the computer instructions further include instructions to perform the following tasks:

track one or more expert's received training associated with at least one tool; and update the expert skill proficiencies associated with an associated specific expert skill within the tracked user skill database based on the associated expert's received training.

15. The system of claim 1, wherein the computer instructions further include instructions to perform the following tasks:

connect an available expert associated with the determined matches to the user.

16. The system of claim 1, wherein the computer instructions further include instructions to perform the following tasks:

track recent tool features utilized by the user associated with a particular tool;

wherein the determination of a match between one or more experts profile having proficiency with the one or more matched tool features and the query tokens also increases the match ranking score of a particular expert profile when the expert profile also has proficiency associated with the recent tool features utilized by the user.

17. The system of claim 1, wherein the computer instructions further include instructions to perform the following task:

determine a need to receive from the user additional refining input regarding the user input query;

present one or more refining questions to the user;

receive from the user additional refining input in response to the one or more refining questions; and tokenize the additional refining input from the user into one or more refining tokens.

18. The system of claim 17, wherein the one or more refining tokens are used with the one or more query tokens to determine matches between the one or more query and refining tokens and the expert skill proficiency data associated with the plurality of expert profiles.

19. The system of claim 1, wherein the computer instructions further include instructions to perform the following task:

create one or more historical question tokens from the one or more query tokens.

20. The system of claim 1, wherein the matches between the query tokens and one or more question tokens having associated historical answers to historical queries are generated based on a match score, and wherein when the match score is below a threshold score the query is flagged and assigned to one or more subject matter experts to generate a historical answer matching the input query.

21. An automatic updating interactive query answering and feature training system, the system comprising:

an automatically tracked expert skill database containing a plurality of expert profiles each having associated expert skill proficiency data regarding each expert's individual proficiencies associated with one or more tools, and wherein the individual proficiencies are based in part on tracking each expert's keystroke and cursor movement inputs into the one or more tools, a historical database containing one or more historical answers associated with one or more historical queries;

a non-transitory computer-readable medium containing one or more sets of computer instructions; and a one or more processors configured to implement the one or more sets of computer instructions from the non-transitory computer readable medium, the computer instructions containing instructions for the one or more processors to perform the following tasks:

automatically track the tools used by a user;

receive a user input query;

determine an associated tool with the input query through analysis of the input query, through a plugin associated with the tool from which the user input query was entered, or through a prompted question asking the user to provide the associated tool information;

tokenize the user input query into one or more query tokens;

analyze the one or more query tokens and associated tool to determine one or more particular features associated with the associated tool;

determine matches between the one or more particular features and the plurality of expert profiles each expert profile having associated expert skill proficiency data; and present a list of experts profiles from the matched expert profiles and prioritized by individual proficiencies associated with the one or more particular features of the one or more tools.

22. An automatic updating interactive query answering and feature training system, the system comprising:

an automatically tracked expert skill database containing a plurality of expert profiles having associated expert skill proficiency data regarding each expert's individual proficiency associated with one or more tools, and wherein the individual proficiencies are based in part on tracking each expert's keystroke and cursor movement inputs into the one or more tools, a historical database containing one or more historical answers associated with one or more historical queries;

a non-transitory computer-readable medium containing one or more sets of computer instructions; and a one or more processors configured to implement the one or more sets of computer instructions from the non-transitory computer readable medium, the computer instructions containing instructions for the one or more processors to perform the following tasks:

determine a tool being utilized by a user through a plugin associated with the tool;

receive a user input query;

tokenize the user input query and determined tool, and associate one or more query tokens with the user input query and determined tool;

compare one or more query tokens from the user input query with one or more historical question tokens;

determine matches between the query tokens and one or more historical question tokens associated with one or more historical answers to one or more historical queries;

present potential matches to the user regarding matches between the query tokens and the historical question tokens;

receive input regarding user satisfaction with regard to the potential matches presented;

determine matches between the query tokens and one or more tool features thus indicating one or more matched tool features;

analyze the tracked expert skill database for expert profiles indicating particular experts having proficiency in the one or more matched tool features of the tool thus indicating one or more subject matter experts;

determine a match between one or more subject matter experts having proficiency with the one or more matched tools and the query tokens;

present a list of matched subject matter experts to the user, each matched subject matter expert being provided with a match ranking, the match ranking indicating a highest likely expertise matching the query tokens; and initiate a dialogue request between a particular matched subject matter expert and the user.

\* \* \* \* \*